(12) United States Patent
Tan (10) Patent No.: US 7,160,929 B1
(45) Date of Patent: *Jan. 9, 2007

(54) NANOCOMPOSITE AND MOLECULAR-COMPOSITE POLYMER FOAMS AND METHOD FOR THEIR PRODUCTION

(75) Inventor: Seng Tan, Beavercreek, OH (US)

(73) Assignee: Wrigt Materials Research Co, Beavercreek, OH (US)

( * ) Notice: Subject to any disclaimer, the term of this patent is extended or adjusted under 35 U.S.C. 154(b) by 457 days.

This patent is subject to a terminal disclaimer.

(21) Appl. No.: 10/075,528

(22) Filed: Feb. 13, 2002

(51) Int. Cl.
*C08J 19/14* (2006.01)
*B29C 43/99* (2006.01)

(52) U.S. Cl. .............. 521/73; 521/79; 521/80; 521/81; 264/45.3; 264/45.9; 264/46.1; 264/52; 264/53

(58) Field of Classification Search ......... 521/79, 521/81, 60, 80; 264/51, 45.9, 46.1, 45.3, 264/52, 53
See application file for complete search history.

(56) References Cited

U.S. PATENT DOCUMENTS 5,851,617 A * 12/1998 Keiser ................ 428/41.8

6,232,354 B1 * 5/2001 Tan ..................... 521/60

FOREIGN PATENT DOCUMENTS

WO 92/17533 * 10/1992

OTHER PUBLICATIONS

Han, X. et al., Influences of Solubility and Viscosity in the Polystyrene/COS Microcellular Foaming Extrusion, Annu. Tech. Conf. —Soc. Plast. Eng., 58.sup.th (vol. 2), 2 1857 (2000).*
Nam, P. et al., Foam Processing and Cellular Structure of PP/Clay Nanocomposites, Proceedings of the First World Conference on Nanocomposites, Chicago, IL (2001).*

* cited by examiner

Primary Examiner—Irina S. Zemel (57) ABSTRACT

U.S. Pat. No. 6,232,354 issued May 15, 2001 describes an environmentally friendly and commercially practicable process for the production of microcellular polymer foams from amorphous, semi-crystalline and crystalline polymers which involves consolidating the polymer, saturating the polymer with an inert gas at elevated temperature and under elevated pressure, and controllably cooling, i.e. quenching the saturated polymer under a variety of temperature and pressure conditions to produce either a closed or open celled microcellular foam or a high density microcellular foam. It has now been discovered that a process similar to that described in this patent can be used for the production of nanocomposite and molecular-composite foams that exhibit exceptional physical properties.

20 Claims, 10 Drawing Sheets

NANOCOMPOSITE AND MOLECULAR-COMPOSITE POLYMER FOAMS AND METHOD FOR THEIR PRODUCTION

The United States of America may have certain rights in this application under the terms of Grant F49620-98-1-0319 and/or Contact No. F04611-00-2-0004 from Bolling Air Force Base and Edward's Air Force Base respectively.

FIELD OF THE INVENTION

The present invention relates to nanocomposite and molecular-composite materials and more particularly foams of such materials and their methods of production.

BACKGROUND OF THE INVENTION

Nanocomposites and molecular composites offer the advantages of significant increases in mechanical, electrical, thermal, and other properties as compared to their base polymers. Molecular composites are commonly referred to as rigid-rod reinforced polymeric composites. This class of composites is formed at the molecular level thereby eliminating the problems of interfacial debonding and phase separation. Nanocomposites may include nano scale reinforcements of polymers, ceramics, or metals in a polymer matrix. The preparation of some nanocomposites is generally considerably simpler than that of molecular composites. Therefore, their material costs can also be considerably less than molecular composites. Experimental results have shown that the efficiency of reinforcement in nanocomposites and molecular composites is remarkably higher than in macroscopic composites.

Foams from amorphous polymers like polystyrene are well known. Commercial polymer foams are processed using a chemical blowing agent (CBA) which decompose during processing, or by blowing gases like CFCs. The use of CBAs results in foams where the cell sizes are of the order of millimeters. The mechanical properties of these foams are usually much weaker (orders of magnitude) than those of the solid parent materials.

Composite, i.e. reinforced polymer foams have been prepared at the microscopic scale. For example, fiber reinforced liquid crystalline polymer foams and semi-crystalline foams, as described in U.S. Pat. No. 6,232,354 of common inventorship herewith, use fibers (in micron size) as a reinforcing phase.

Nanocomposites and nanostructured materials offer the promise of significant increases in mechanical, electrical, thermal resistant, and other properties. Among various nanostructured materials, polymer base nanocomposites are much lighter in weight, and have superior specific mechanical properties and multifunctional properties, and are much easier to use for materials production and applications in most cases. Nanocomposites can generally be prepared in two ways: (1) blending of two or more constituent materials with at least one component in nanoscale; and (2) by creating a nanocomposite by synthesizing two or more constituent chemicals that exhibit distinct characteristics. In this invention, we have developed microcellular foams using nanocomposites prepared by both routes. The first class of nanocomposites can be represented by blending carbon nanofibers or nano powders with a polymer material. The second class can be represented by POSS-polymer system where POSS stands for Polyhedral Oligomeric Silsesquioxanes.

Most mechanical properties of microscopic scale composites can be predicted with reasonably accuracy by rule-of-mixtures. Nanocomposites and molecular composites, on the other hand, cannot be predicted using the rule-of-mixtures. To the best of our knowledge, foams from nanocomposites and molecular composites have not previously been prepared.

OBJECTS OF THE INVENTION

It is accordingly an object of the present invention to provide a method for the production of nanocomposite and molecular composite foams.

It another object of the present invention to provide novel classes of microporous nanocomposite and molecular-composite foams.

SUMMARY OF THE INVENTION

U.S. Pat. No. 6,232,354 issued May 15, 2001 and of common inventorship herewith describes an environmentally friendly and commercially practicable process for the production of microcellular polymer foams from amorphous, semi-crystalline and crystalline polymers which involves consolidating the polymer, saturating the polymer with an inert gas at elevated temperature and under elevated pressure, and cooling, i.e. quenching the saturated polymer under a variety of temperature and pressure conditions to produce either a closed or open celled microcellular foam or a high density microcellular foam, as defined hereinafter. It has now been discovered that a process similar to that described in this patent can be used for the production of nanocomposite and molecular-composite foams that exhibit exceptional physical properties.

DETAILED DESCRIPTION

The present invention describes microcellular foams characterized by cell diameters from 1 to 100 micron and cell densities of $10^9$ to $10^{12}$ cells/cc and methods for their production. The foaming technique is based on the principle of thermodynamic instability that can create pores with uniform size. The pore sizes can be controlled from submicron to hundreds of microns in diameter. High-density microcellular foams are characterized by 50% of pores. Ultra-low density microcellular foams are characterized by over 95% of pores or less than 3 pcf (0.048 g/cc) where pcf stands for pounds per cubic feet. Existing polymer foams are either monolithic or reinforced with macroscopic scale materials. This invention relates to the processing techniques of microcellular nanocomposite and molecular composite foams based on the principle of thermodynamic instability with an inert gas as the foaming agent. Features of these two classes of microcellular foams include ultralight weight and superior mechanical properties, respectively.

Figure 1:
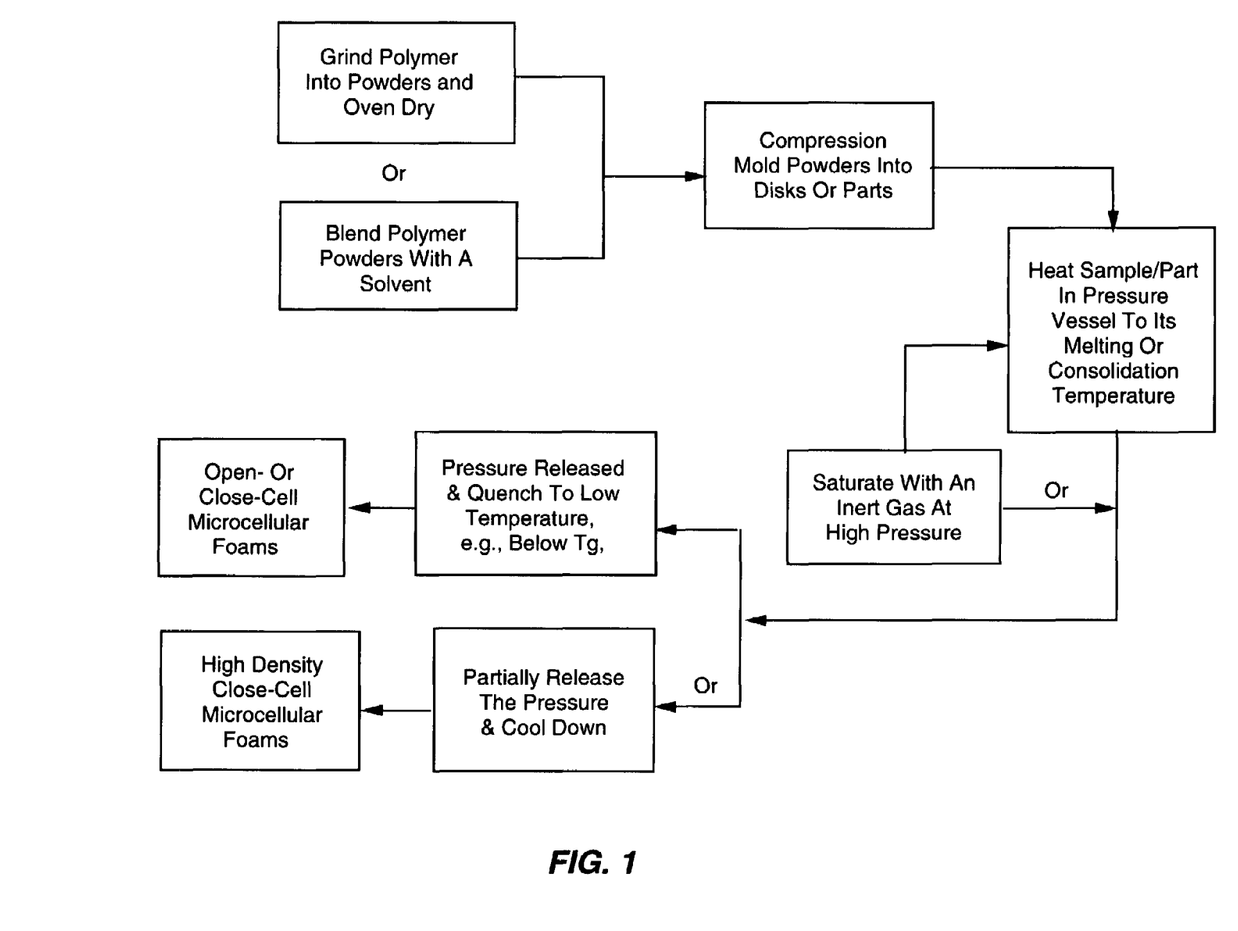
FIG. 1 is a process flow diagram showing the processing sequence for the production of nanocomposite and molecular composite foams.

As shown in FIG. 1, the process of the present invention comprises: (1) either: A) grind or otherwise prepare polymer as a fine powders without any solvents or additives and dry the fine powder in an oven; or B) blend polymer powder with a solvent; (2) compression mold the polymer powder into a shape; (3) consolidate the shape by heating it to its softening or melting temperature in a pressure vessel under an inert atmosphere; (4) saturate the shape or sample with an inert gas at high pressure; this step can be done either before the heating, during the heating, or after reaching the consolidation temperature; (5) after saturation for preferably from about 10 minutes to about 45 minutes, either A) vent the gas rapidly and cool down the sample quickly to a temperature below the Tg of the sample by either injecting pressurized cool air into the vessel or opening the vessel very quickly to allow cooling to a temperature below the Tg in less than about 2 minutes preferably less than 1 minute; or B) partially releasing the pressure to allow the fluid/gas dissolved in the polymer to expand, then cool down the sample to a temperature below the Tg of the sample. Option A will result in either closed cell or open cell microcellular foams. Ductile materials tend to result in foams with a closed cell structure whereas brittle materials have a better chance to result in foams with an open cell structure. If the polymer powders were prepared without a solvent, step (1), they should be compression molded into a compact form. The compression stress should be over about 8000 psi, preferably over about 10000 psi, when the compression molding is performed at room temperature. The compression stress value can be considerably lower if the operation is conducted at elevated temperatures. Since the consolidation operation can be performed at virtually any temperature depending upon the temperature at which it is performed, no specific compression value is specified. Step (3) requires that the polymer be heated to its consolidation temperature so that it will become achieve a continuous phase that provides structural integrity to the consolidated shape. The heat up rate can vary from 1° C./min to 20° C./min. The inert gas used for saturating the polymer can be any inert gas like carbon dioxide, nitrogen, argon, helium, etc. and efforts should be made to ensure uniform heating of the consolidated polymer shape.

Nanocomposites comprise three part systems. These three portions are a nano-sized organic or inorganic reinforcer such as a nano-scale ceramic powder, metal or carbon fiber, a polymer and a void portion. Such materials have been prepared by a number of researchers and they and their methods of preparation are described in numerous publications such as U.S. Pat. Nos. 5,965,202, 6,171,687 and 6,214,746.

POSS technology was derived from a continually evolving class of compounds closely related to silicones through both composition and a shared system of nomenclature. These materials comprise hybrid polymers consisting of polymers and ceramics in nano-scale. The chemical composition is a hybrid, intermediate ($RSiO_{1.5}$) between that of silica ($SiO_2$) and silicone ($R_2SiO$), wherein R is an organic moiety. The hybrid polymers possess thermomechanical properties somewhere between the constituents of polymers and ceramics. POSS monomers have been widely described in the literature.

The chemical diversity of POSS technology is very broad and a large number of POSS monomers and polymers are currently available for processing into structural components. Examples include acrylics, alpha-olefins, alpha-epoxies, isocynates, silanes, silanols, phenols, styrenics, chlorosilanes, aminosilanes, alkoxysilanes, organo-halides, organo-alcohol, amines, and urethanes. The monomers for POSS synthesis are available in both solid and liquid forms and are soluble in most common solvents. POSS chemical feedstocks can be added to many polymer types including glassy, elastomeric, rubbery, semicrystalline and crystalline. POSS has the ability to control the motions of the polymer chains due to its nanoscopic size and its relationship to polymer dimensions. Researchers using extruders and injectors have demonstrated processability of POSS.

One class of advanced molecular composite (MC) uses rigid rod polymer molecules (the reinforcing element) dispersed in a matrix of a flexible coil polymer at the molecular level. Rigid-rod molecular composites can provide revolutionary performance improvements based on nanostructured materials with specified objectives in structural or functional properties. Several approaches to obtain these materials have been developed during the last decade. The main challenge for preparing molecular composites is that rigid rod polymer have low solubility and are susceptible to aggregation. Most rigid rod molecular composites use strong acids as a solvent. Block and graft polymerization has been an approach used to overcome this problem for preparing molecular composites. Another solution is to synthesize the rigid rod macromolecules in the matrix monomers via in situ polymerization.

Two representative examples of molecular composites are the p-terephthaloylamide/nylon system and the poly-p-phenylenebenzobisthiazole/poly-2,5(6)-benzimidazole system. Additionally, we have found that the polybenzobisthiazole (PBZT) and 2-sulfo-PBI rigid-rod polymers have high molecular weights and are good candidates to form molecular composites for the processing into molecular composite foams. We have found that up to 10 wt % of rigid-rod polymer can be incorporated into a thermoplastic polymer without loss of a glass transition (Tg). The Tg of a commercially available poly(4-vinylpyridine) was in fact increased from 153 to 210° C. (37% improvement) by the addition of only 10% of poly(p-phenylenebenzobisimidazole) with a sulfonic acid pendent ("2-sulfo-PBI"). The storage modulus was also increased considerably as a result of this rigid-rod incorporation.

In any of the processes described herein, the presence of a "loading" or "filling" agent or "filler" of the type described below does not affect the ability of the process to produce an acceptable, and in many cases exceptional, reinforced microcellular foam. Consequently when used herein, the terms "polymer" "polymer shape" etc. are intended to include polymeric compositions which include one or more "loading" or "filling" agents. Acceptable filling agents include, but are not limited to such materials as chopped glass fibers, carbon, metallic and aramid fibers, minerals such as calcium carbonate powder and ceramic whiskers and fibers. So long as the filler material is capable of withstanding the operating temperatures and pressures of the foaming process without adverse decomposition or other effects, it is considered acceptable filler. As will be shown in the examples below, the presence of fillers in combination with the particular properties imparted to the polymer foam by the process of the instant invention can, in fact, result in the production of parts or shapes which demonstrate exceptional mechanical properties, apparently, because of the unique morphology obtained when such fibrous fillers align with the struts of the individual foam cells.

In the case of polymers available as fine powders, it is, of course, not necessary to further grind the polymer prior to molding or shaping. Similarly, in the case of polymer shapes already in the form of induction molded, extruded or compression-molded parts, it is not necessary to further compression mold or shape the part prior to consolidation. In many instances, when the polymer part is obtained as an induction molded or compression molded part, additional consolidation is not necessary. Consolidation is only required in those instances where the polymer shape may not be in a continuous phase. In this case it is necessary to heat the part up to at least the softening point of the polymer and to apply pressure adequate to assure that a continuous phase with minimal porosity and air content is formed. Since the conditions necessary to achieve such a state will vary significantly from polymer to polymer, it is difficult to place any meaningful limitations on this process step, however these conditions are readily determinable by or known to the skilled artisan for any particular polymer composition. As described below, it may be necessary in certain instances to add a solvent or to co-polymerize a specific starting material in order to achieve adequate "pliability" to reach consolidation as described herein.

If compression molding of a powdered polymer prior to consolidation is required, molding at pressures above about 7500 psi and preferably above about 12,000 psi have been found satisfactory in most cases if compression is performed at room temperature. Consolidation may however be performed at elevated temperatures, i.e. at or above the softening point of the polymer, in which case much lower consolidation temperatures may be used. Similarly, when a solvent is used to improve the "pliability" of the starting material much lower pressures may be used to obtain consolidation, as demonstrated in the examples below.

The foaming process of the present invention is performed in a high-pressure reactor or vessel, for example an autoclave, at elevated temperature to increase the solubility of the gas in the polymer. Gas saturation is achieved by raising the temperature of the polymer to about its melting or softening point in an atmosphere of an inert gas such as helium, nitrogen, $CO_2$, argon, etc. under a pressure above about 800 psi, and preferably above about 3000 psi, and holding these conditions for a period of from about 10 minutes up to about 1 hour, and preferably from about 15–45 minutes. Soaking pressures up to about 10,000 psi have produced useful results; however, the use of soaking pressures above this level is entirely possible. Heat up should be at a rate of between about 1° C./min and about 10° C./min. The particular holding time, temperature and pressure will of course vary according to the particular polymer being processed, the gas being used and the cell size and density wished to be obtained. Soak time is generally dependent upon the thickness of the part or shape being processed, it being necessary for the foaming gas to penetrate and dissolve in the polymer all of the way to the center of the part or shape to obtain a homogeneous structure. Thus, although the soaking time is preferably between about 15 and about 45 minutes, longer soaking times may be necessary for larger, i.e. thicker, parts and the use of such extended soak times for such larger parts is clearly contemplated herein.

After soaking for the appropriate amount of time and at the appropriate pressure, depending upon the particular polymer and part being treated, one of two quenching procedures may be utilized to complete the processing, depending upon of the structure wished to be achieved in the final product.

According to the first quenching option, after soaking is complete, the high pressure is released and the polymer shape is quenched to a temperature below its $T_g$ using a fluid like pressurized gas. Once the temperature falls below the $T_g$ of the polymer, flow of the quenching fluid may be halted. The use of this option yields a low-density open or closed cell microcellular foam.

According to the second quenching option, after soaking is complete, the pressure is partially released and the polymer shape allowed to cool below the $T_g$ of the polymer, whereupon the pressure is released. In this case, a high density, closed cell polymer foam is produced. Partial release of the soaking pressure is meant to refer to any pressure below that at which soaking occurs. The magnitude of the pressure release will be determined by the cell size to be obtained, it being intended that the pressure release serves to permit the dissolved gas to expand and the pressure reduction serves to control the amount and rate at which gas expansion can occur in the polymer. In all cases, it is critical that cooling be controlled, i.e. carried out under conditions that will permit foaming as desired to obtain a desired polymer foam.

The above process does not use a nucleating agent and, hence, may be characterized as a homogeneous nucleation process. It is, however, possible to blend a nucleating agent such as talc with the polymer before compression forming of the polymer shape or part, if this is deemed desirable.

The principle operating variables that determine the nucleation rate, and hence the cell density, are the applied soaking or saturation pressure, the gas solubility in the particular polymer being processed and the quench rate as described above. Any of these variables may be adjusted to meet a specific material requirement.

Specific processing parameters for specific polymeric materials are set forth in the following examples which provide the guidance necessary for the skilled artisan to achieve the desired result with any suitable polymer within the process guidelines described hereinabove.

Because of the high compressive strengths demonstrated by the foams and composites of the present invention, they are particularly useful in composite structures of the type which utilize a foamed polymer as the core of a metal, or otherwise skinned laminate. A lack of adequate compressive strength, thermal stability and fracture toughness have been particular shortcomings of prior art such materials. The enhanced compressive strengths of the foams of the present invention make them ideal candidates for such applications.

Figure 2:
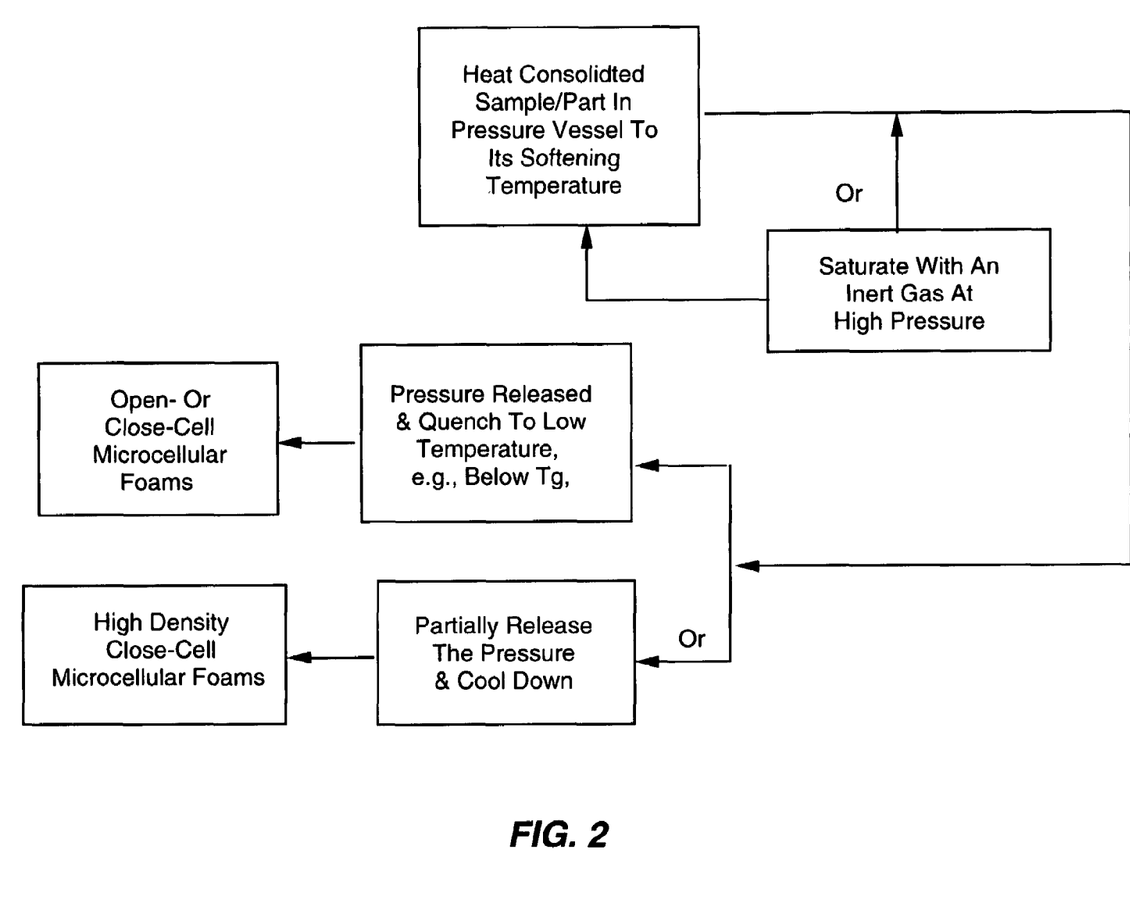
FIG. 2 shows an alternative processing sequence for the production of nanocomposite and molecular composite foams.

If a raw material, i.e. a nanocomposite or a molecular-composite material, is supplied in consolidated form such as a sheet, rod, or specific shape, this indicates that they have been processed at the softening or melting temperature of the material. In these cases, the alternative foaming procedure shown in FIG. 2 should be used.

A consolidated raw material can be produced by, for examples, injection molding, extrusion or compression molding. In such cases, the shape can be heated in a pressure vessel to its softening temperature that may be somewhat lower than that used for foaming the raw material when first presented in an unconsolidated form. Saturating inert gas can be easily dissolve in the polymer once it reaches its softening temperature. The inert gas saturation time in the polymer can be as short as a few minutes for thin samples but can also be longer than 45 minutes if the samples are excessively thick, for instance, over 1 foot thick. Sufficient soak must be used to permit the inert gas to homogeneously dissolve in the entire specimen, from surface to center. Therefore, if a longer time is needed it should not be restricted by the range of time stated in step (3) above.

Most polymers can be foamed to achieve low density using step (1) option A mentioned in the last paragraph. For polymers that are very rigid, or do not soften considerably, at elevated temperature, then option B is needed for the processing of low density foams. For example, ultra-low density microcellular foams can be processed using option A for POSS-PMMA nanocomposites whereas the density of rigid-rod molecular composite foams can only be reduced considerably by reverting to process option B. The use of process option A will result in high-density molecular composite foams. Rigid-rod molecular composites are very rigid even at high temperatures. With 50% of rigid-rod content the composites lose their Tg. The rigid-rod also prevents the pressurized inert gas from dissolving into the polymer. Therefore, the assistance of a solvent may be helpful in such cases in terms of softening the sample and creating channels for pressurized inert gas diffusion into the interior part of the sample. The amount of solvent used can be varied from 5% to 150% depending upon the particular material undergoing treatment. The higher the percentage of solvent used the lower the compression stresses needed to compact the raw material into a consolidated. For example, when a high percentage of solvent is used, the sample can, in some cases, be compacted by hand using a die. Excessive force will squeeze out the solvent from the sample thereby defeating the purpose of the introduction of the solvent in the inert gas diffusion operation.

The above-mentioned solvents may be a dilute acid, or an organic solvent. The solvents are preferably organic solvents including N,N-dimethyl formamide, N, N-diethyl formamide, N,N-dimethylacetamide, N,N-diethyl acetamide, N,N-dimethylmethoxyacetamide, N-methyl-t-pyrrolidinone, dimethyl sulfoxide, diethyl sulfoxide, dimethylsulfone, diethylsulfone, chloroform, hexamethylsulforamide, 1,4-dioxane, benzene etc.; the acid solvents include dilute sulfuric acid, m-Cresol, methanesulfonic acid, formic acid, and the like; as well as Lewis acids such as nitromethane with aluminum chloride or nitrobenzene with gallium chloride. A solvent that has a boiling point close to the softening temperature of the polymer is an ideal and preferred choice for foaming.

A number of rigid rod polymers can be foamed as described herein including: polybenzimidazole (PBI), sulfopolybenzimidazole (2-Sulfo-PBI), polybenzobisthiazole (PBT), sulfopolybenzobisthiazole (SPBT), sulfopolybenzobisthiazole (SBPPBT), polybenzobisoxazole (PBO), hydroxy functionalized copolymer of polybenzoxazole (HPBO), and polyimide. These rigid rods can be blended with many different kinds of polymers to form molecular composites. Several examples of foams prepared using these materials are given below including PBZT/PEEK, SPBI/P2VP, and Parmax™-1200 for the processing of microcellular foams. Since rigid rod molecular composites are very rigid even at elevated temperature, they can be copolymerized or blended with a suitable less rigid polymer to reduce their viscosity thereby further reducing the density of the foam produced therewith. It should be noted that the method of the present invention is not limited to the specific materials cited in the examples or elsewhere herein, but rather, is applicable to all kinds of molecular composites and copolymers and blends of compatible, less rigid polymeric materials with rigid-rod molecular composites.

The density of the foam can be controlled by using different amounts of the raw material to achieve various thicknesses of the compacted prefoamed sample. The density of the nanocomposite or molecular composite foams can be controlled by the: (1) gas saturation temperature; (2) saturation pressure value; (3) cooling rate after releasing the saturation pressure; and (4) different kinds of inert gas. Since different inert gases exhibit different solubilities in any particular polymer, the density of the foam produced can be controlled through the selection of an appropriate inert gas of a specific solubility in the particular nanocomposite or molecular-composite being foamed.

As mentioned previously, one route of preparing a nanocomposite is to blend a polymer with a reinforcing element that can be either one or the combination of the following ingredients: fibers, whiskers, particles, and complex regular or irregular shapes. These reinforcing element should be mostly in nano size to classify as nanocomposites. However, it should not interpreted as only nano scale element can be added. Some percentage of reinforcing element in micron or submicron scale may be added, if necessary, to achieve some functional/performance properties.

The following examples taken with the accompanying Figures and the foregoing disclosure will serve to better illustrate the invention and should in no way be interpreted as limiting in any fashion.

EXAMPLES

Example 1

Figure 3:
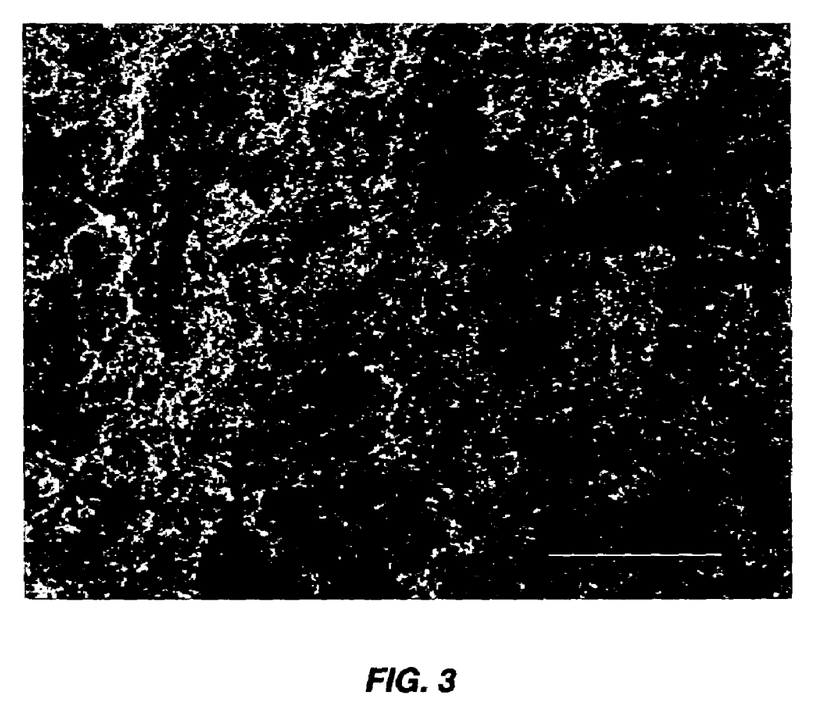
FIG. 3 is an SEM photomicrograph of a typical high-density POSS-PMMA foam with 5% POSS.
Figure 4:
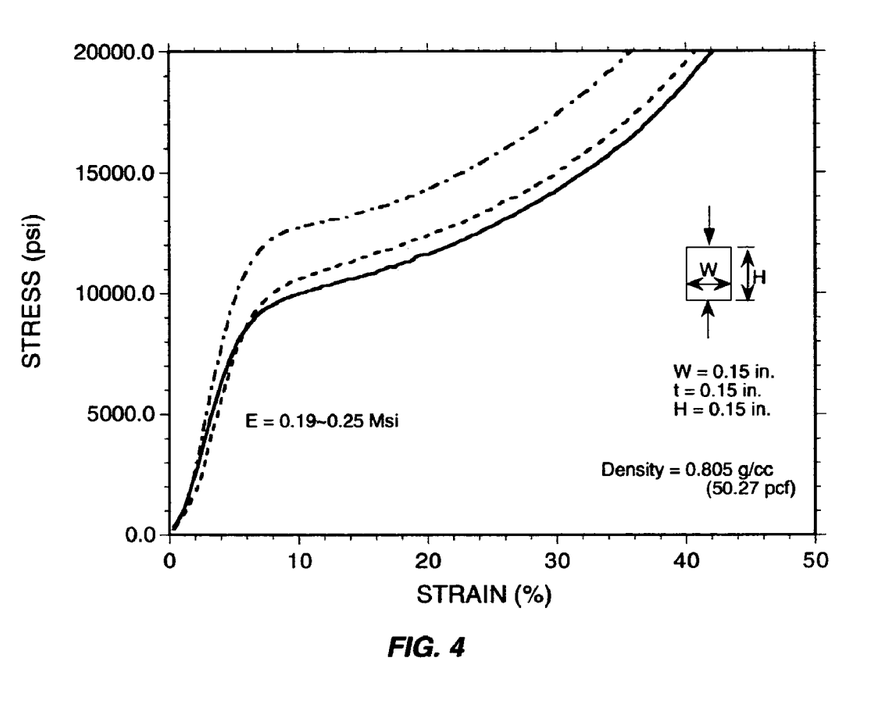
FIG. 4 is a graph showing the compression stress-strain relationship of high-density POSS-PMMA foams comprising 5% POSS.

POSS-PMMA with 5/95 ratio was synthesized into fine powder form. The specific name of this nanocomposite is Cp7T8-propylmethacrylate-methylmethacrylate. The Tg (glass transition temperature) of this material is about 120 C. The powders were compression molded into disks about 1.125-in in diameter and 0.108-in thick at room temperature. Compression stresses in the range of 8,000 psi to 15,000 psi were used. Nitrogen gas was used to saturate the POSS-PMMA disks at about 3600 psi at temperature ranging from 160° C. to 180° C. in an autoclave. The disks were "soaked" at these temperatures for about 30 minutes. The saturation fluid, nitrogen gas, was then released rapidly and disks cooled down with a pressurized nitrogen gas flow ranging from 15 to 80 psi. After cooling down, the foams were white in color. FIG. 3 is an SEM photomicrograph of the foamed 5/95 POSS-PMMA. The pore size was found to range from 2 to 10 microns in diameter and the distribution is very uniform for the entire specimen. A close-up of the SEM photomicrograph shows that the pores are closed cells. The density of the foam is 0.81 g/cc (50.3 pcf where pcf denotes pounds per cubic feet). The results of compression testing of these foams are shown in FIG. 4. The yield strength at 15% strain ranges from 10.5 to 13 ksi. This is extremely high compared to commercially available foams closed cell foams. The foam specimen was compression loaded to 70% strain and reached 100 ksi. without breaking. Post-test examination of the specimen showed that it deformed vertically with no major deformation in the other two directions. This indicates that the foam is extremely damage tolerant.

Example 2

Figure 5:
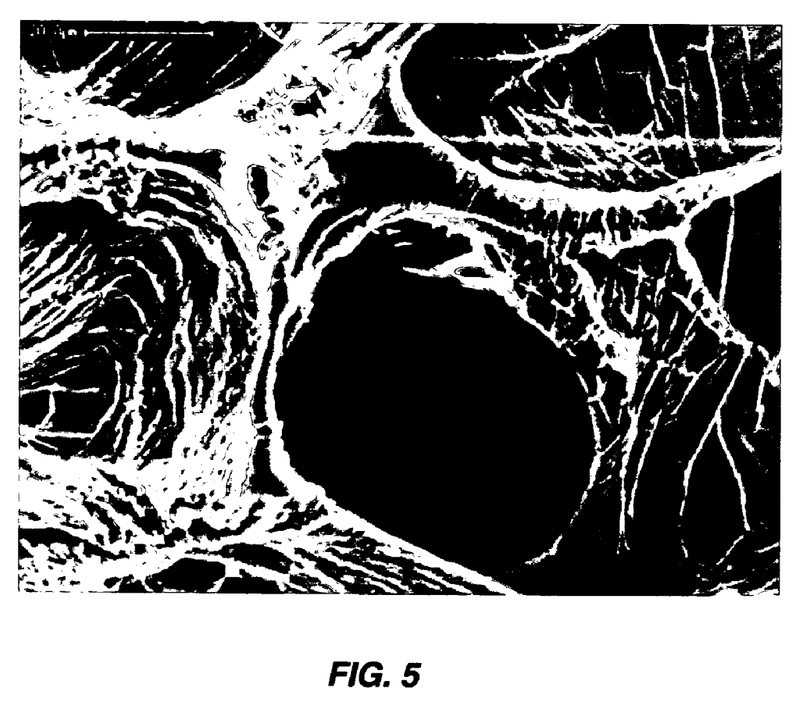
FIG. 5 is an SEM photomicrograph of an ultra-low density POSS-PMMA foam comprising 10% POSS.
Figure 6:
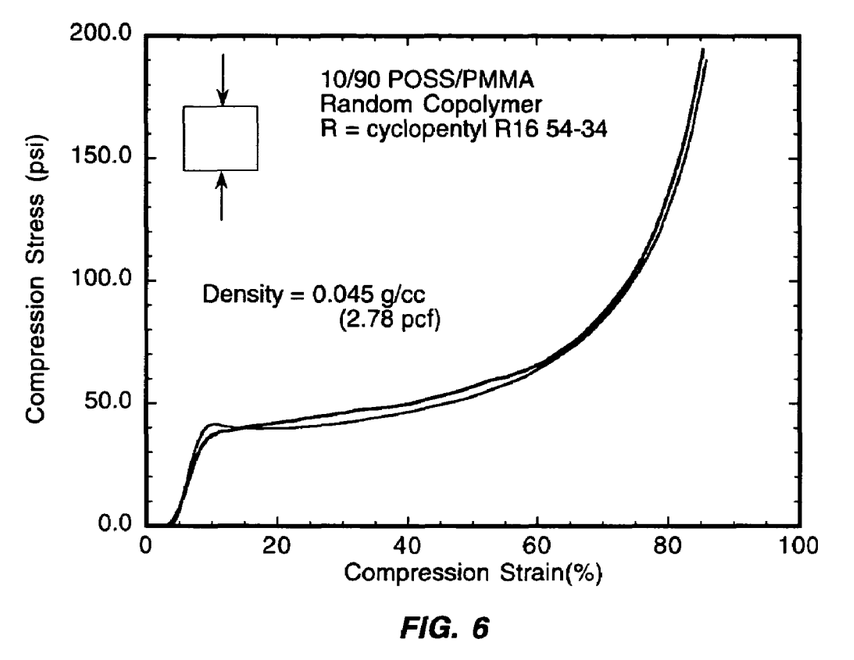
FIG. 6 is a graph showing the compression stress-strain relationship of ultra-low density POSS-PMMA foams with 10% POSS.

POSS-PMMA fine powders with 10/90 ratio were synthesized using known methods. The chemical composition of this nanocomposite is $C_{36}H_{74}Si_8O_{14}$. The powders were compression molded into disks about 1.125-in in diameter and 0.145-in thick at room temperature. Compression stresses in the range of 8,000 psi to 15,000 psi were used. Carbon dioxide gas was used to saturate the POSS-PMMA disks at about 3100 psi at temperature ranging from 170° C. to 200° C., and "soak" periods of about 30 minutes in an autoclave. The saturation fluid, $CO_2$ gas, was released rapidly and cooled down with a pressurized nitrogen gas flow ranging in pressure from 15 to 80 psi. After cooling down, the foams were white in color. FIG. 5 is an SEM photomicrograph of the foamed 10/90 POSS-PMMA. The pore size was found to range from 50 to 100 microns in diameter over most of the specimen. The pores are closed cells. The density of the foam is about 0.027 g/cc (1.69 pcf). The same procedures have been used to foam 10/90 POSS-PMMA of a slightly different composition, $C_{34}H_{74}Si_8O_{14}$. This resulted in foams with a density of about 0.045 g/cc (2.78 pcf). The results of compression testing of these foams, as shown in FIG. 6, indicate that their yield strength is about 40 psi. The strength increases to 200 psi as the applied strain reaches 85%. As with the previous POSS-PMMA foams this group also only deformed vertically with no major deformation in the other two directions. This family of POSS-PMMA foams is also extremely damage tolerant.

Example 3

POSS-PMMA fine powders with 30/70 ratio were synthesized using conventional methods. The powders were compression molded into disks about 1.125-in in diameter and 0.092-in thick at room temperature. Compression stresses in the range of 8,000 psi to 15,000 psi were used. Carbon dioxide gas was used to saturate the POSS-PMMA disks at about 3800 psi at temperature ranging from 170° C. to 200° C. and the disks soaked at these temperatures for about 30 minutes in an autoclave. The saturation fluid, $CO_2$ was released rapidly and cooled down with a pressurized flowing nitrogen gas at a pressure of from 15 to 80 psi. SEM analyses show that the pores are closed cells. The density of the foam is about 0.0714 g/cc (2.5 pcf).

Example 4

Figure 7:
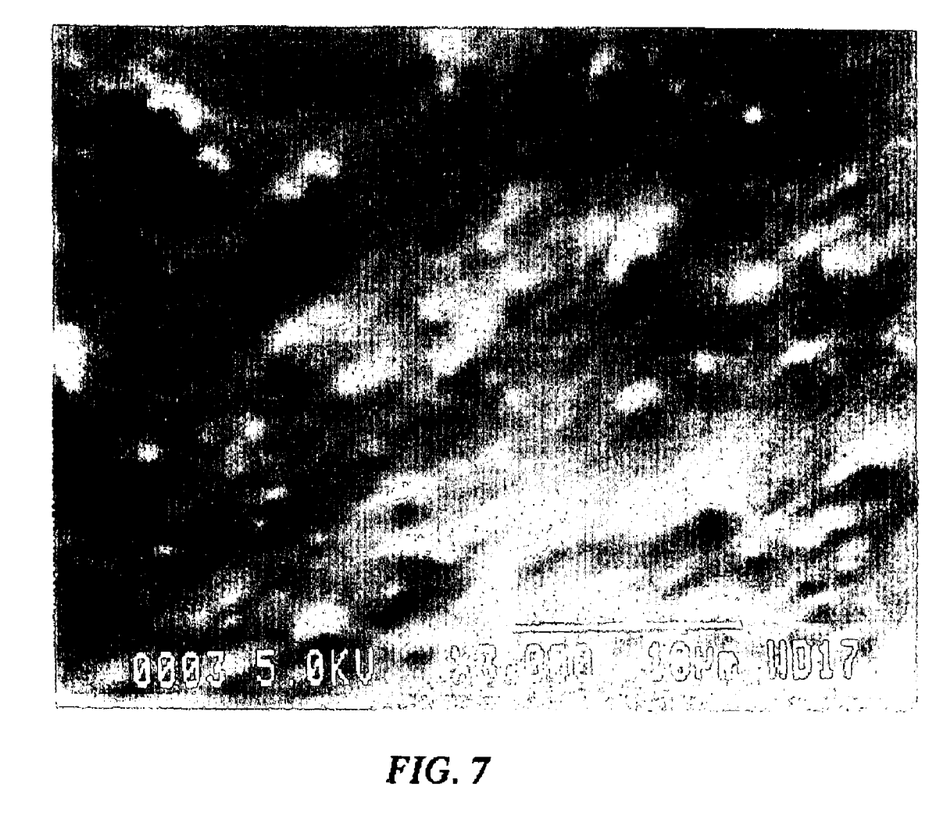
FIG. 7 is an photomicrograph showing nano $Al_2O_3$ powders uniformly distributed in the walls of a $Al_2O_3$/LCP nanocomposite foam.

Liquid crystalline polymer (LCP) nanocomposite foams have been processed using Amoco's Xydar 900 (4500 McGinnis Ferry Rd., Alpharetta, Ga. 30202) and nano powders of Aluminum oxide ($Al_2O_3$) purchased from Nanophase Technologies Corp. (453 Commerce Street, Burr Ridge, Ill. 60521). Amoco stated that the melting temperature of unfilled Xydar SRT-900 is 349° C. We found that the melting temperature of this polymer is considerably higher without a shear force. The average particle size of aluminum oxide used for this experiment is 37 nm. About 10% by weight of $Al_2O_3$ was blended with 90% of Xydar using a high-speed blender. The powders were compression molded using a die about 2.25-in in diameter following the procedures given in Option A in FIG. 1. Carbon dioxide gas was used to saturate the $Al_2O_3$-LCP nanocomposite disks at about 3200 psi at temperature ranging from 390° C. to 450° C. in an autoclave and soaked at these temperatures for about 40 minutes. The saturation fluid $CO_2$ was released rapidly and cooled down with flowing pressurized nitrogen gas. Typical SEM morphology is similar to that shown in U.S. Pat. No. 6,232,354. As shown in FIG. 7, at a higher magnification, 3000×, at the wall of the foam the nano $Al_2O_3$ powders are uniformly distributed in the Xydar matrix. The use of a nano scale ceramic powder like $Al_2O_3$ for the processing of nanocomposite foams, $Al_2O_3$-LCP, can effectively increase the thermal stability of the LCP foams. This family of nanocomposite foams with other percentages of $Al_2O_3$ has also been foamed successfully. Other similar nano scale materials can also be blended with a polymer to form nanocomposite foams using the method of the present invention.

Example 5

Figure 8:
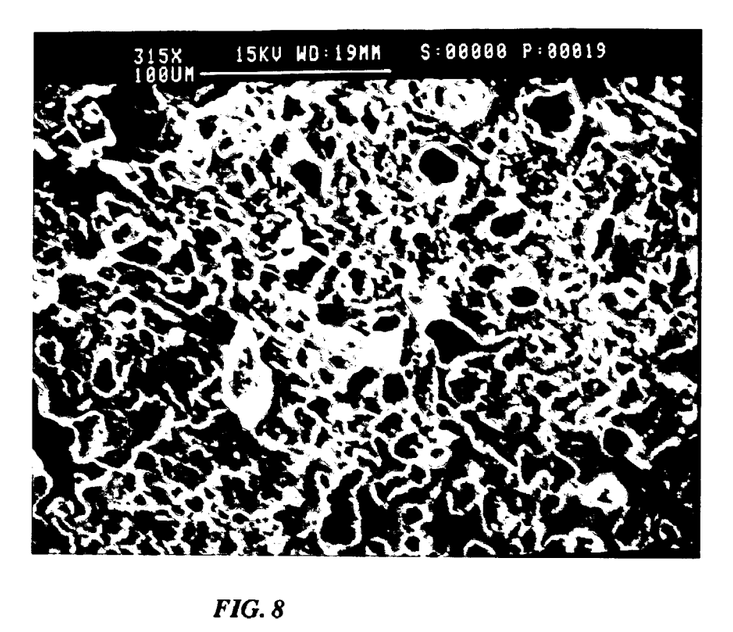
FIG. 8 is an SEM photomicrograph of a 5/95 PBZT/PEKK molecular composite foam with density about 0.78 g/cc.
Figure 9:
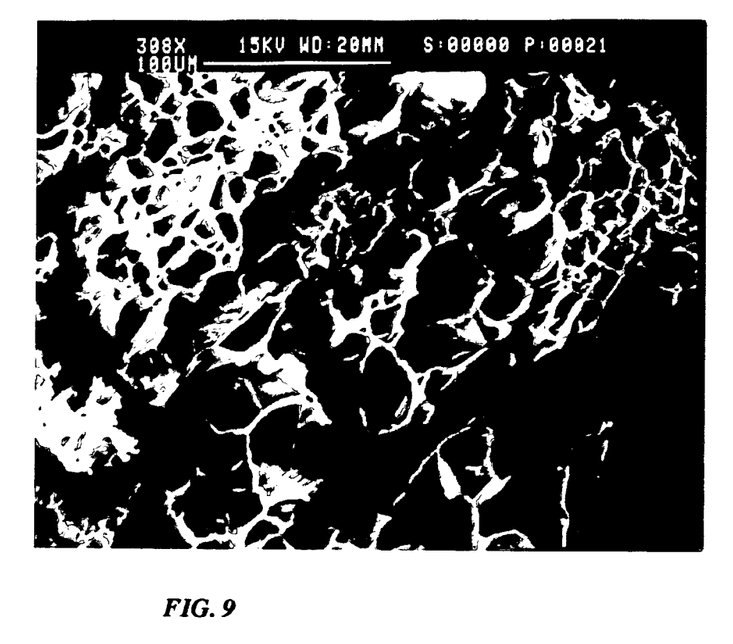
FIG. 9 is an SEM photomicrograph of a 5/95 PBZT/PEKK molecular composite foam with density about 0.60 g/cc.

Five percent of polybenzobisthiazole (PBZT) rigid rod synthesized using conventional practices was blended with 95% poly(etherketoneketone) (PEKK) to form 5/95 PBZT/PEKK molecular composites using methanesulfonic acid ($CH_3SO_3H$) according to conventional practice. The molecular composites appear to be string like and yellow in color. This class of molecular composites is stiff and only softens slightly at elevated temperatures that make them very difficult to foam. The raw materials were ground into fine powders. About 2.8 ml of NMP (1-Methyl-2-pyrrolidinone) was blended with 2.8 gm of PBZT/PEKK powders. The material was compression molded into disks about 1.125-in in diameter and 1.3-in thick at room temperature. The compression stress can be ranging from 50 to 8000 psi. A higher stress will squeeze out some solvents from the die and result in less solvent in the material. Carbon dioxide gas was used to saturate the PBZT/PEKK nanocomposite disks at about 8000 psi at temperature ranging from 330° C. to 360° C. The disks were soaked at these temperatures for about 45 minutes. The saturation fluid, $CO_2$, was released rapidly and cooled down with pressurized nitrogen gas as previously described. SEM analyses show that the pores are closed cell and on the order of 10 microns in diameter, as shown in FIG. 8. The density of the foam is about 0.78 g/cc (48.7 pcf). The experimental procedures mentioned above were repeated with a lower value of compression stress for the preparation of the sample disk. A somewhat higher temperature was used for the saturation with the $CO_2$ fluid. This results in a lower density PBZT/PEKK microcellular foam. SEM analysis indicates that the cell size ranges from about 20 to 40 micron meter, as shown in FIG. 9. The density of the foam is about 0.60 g/cc (37.5 pcf). Mechanical testing of 5/95 PBZT/PEKK foams with a density about 0.95 g/cc (58.2 pcf) shows that the yield strength is between 9 and 10 psi. The specific compression strength of 10/90 and 5/95 PBZT/PEKK are 70–75 and 66.5 MPa/g/cc respectively as compared to 37.6 MPa/g/cc for pure PEKK foams. This clearly shows the strength improvement of molecular rigid-rod reinforcement. Lower density foams can be processed from this family of rigid-rod molecular composites by adjusting the amount of solvent used, the foaming temperature, and the pressure of the saturation fluid. Without the use of a solvent, option A of FIG. 1, the foams' densities are relatively very high, about 0.92 to 1.3 g/cc.

Example 6

Molecular composites were prepared from poly(2-vinylpyidine)(P2VP) and 2-sulfo-PBI rigid-rod polymer. Poly (p-phenylenebenzobisimidazole) with a sulfonic acid pendent (SPBI) was synthesized using conventional practice. Two batches of SPBI/P2VP molecular composites were prepared, one contained 5% and the other contained 10% of SPBI rigid rods. After precipitation this family of molecular composite, like PBZT/PEKK, does not readily dissolve in any solvent. Microcellular foams were processed using option B shown in FIG. 1. The SPBI/P2VP molecular composites were ground and about 2.8 gm of this powder were mixed with about 2.5 ml of NMP. The material was then compression molded into disks with a compression stress ranging from 1000 to 10000 psi. As in the previous example, more solvent is squeezed out from the material when higher compression stress is used. Carbon dioxide gas was used to saturate the SPBI/P2VP nanocomposite disks at about 3800 psi at temperature ranging from 160° C. to 300° C. and soaking periods of about 20 minutes. The saturation fluid, $CO_2$, was released rapidly and cooled down with a pressurized nitrogen gas as previously described. SEM analyses show that the pores are closed cell and range from 10 to 40 microns in diameter. The density of the foams obtained is about 0.78 g/cc (48.9 pcf). The density of the foam can be reduced, if desired, by adjusting the amount of solvent used, the foaming temperature, and the pressure of the saturation fluid. Without the use of a solvent (option A in FIG. 1), the densities of the foams are around 1 g/cc under the same foaming condition.

Example 7

Figure 10:
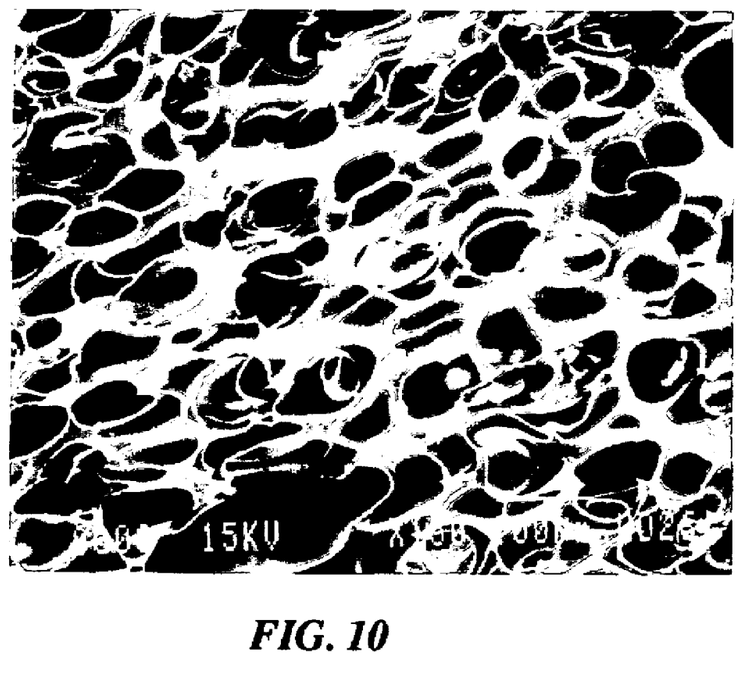
FIG. 10 is an SEM photomicrograph of a Parmax™-1200 rigid-rod composite foam.
Figure 11:
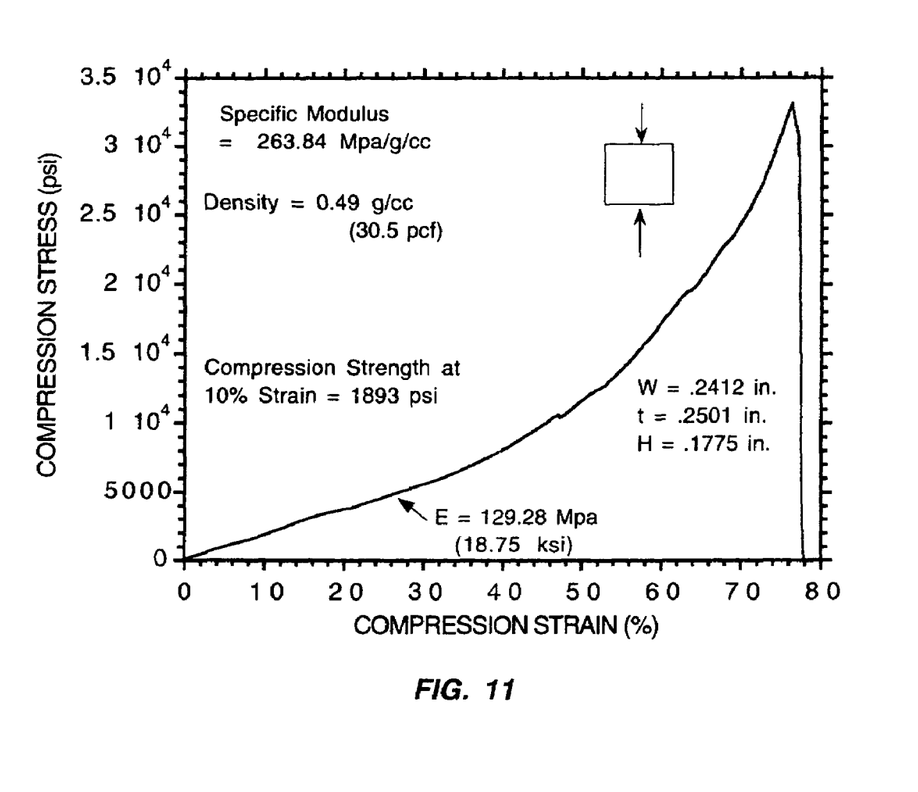
FIG. 11 is a graph showing the compression stress-strain relationship of a Parmax™-1200 rigid-rod composite foam.

Another version of rigid-rod reinforced composites is Poly-X or Parmax™ sold by Maxdem Inc. at San Dimas, Calif. Parmax™-1000 or -1200 polymers are based on a substituted poly(1,4phenylene) structure where each phenylene ring has a substituted R derived from a wide variety of organic groups. The rigid backbone provides excellent stiffness and strength to this family of polymers. As with other rigid-rod molecular composites, this group of polymers only softens slightly at elevated temperatures and is much more difficult to foam than common polymers. Parmax™-1200 was purchased in powder form. The polymer can be used with or without additional grinding. About 10 gm of powders are mixed with 10 ml of NMP. It was compression molded into disks with 2.25-in in diameter under a compression stress ranging from 100 to 1000 psi. Option B in FIG. 1 was used to foam this material. Carbon dioxide gas was used as the foaming fluid at about 3700 psi at temperature ranging from 240° C. to 350° C. and soak times of about 30 minutes. The saturation fluid was released rapidly and cooled down with a pressurized nitrogen gas as previously described. SEM analyses show that the pores are closed cell and range from 80 to 100 microns in diameter as shown in FIG. 10. The density of the foam obtained is about 0.49 g/cc (30.5 pcf). The compression stress-strain curve, FIG. 11, shows that this microcellular foam is very ductile and has superior fracture toughness. The stress of the foam increases monotonically as a function of the applied strain without a plateau region that occurs in some commercial foams. The compression strength and specific compression strength at 10% strain are about 13.1 MPa (1893 psi) and 26.6 MPa/g/cc, respectively. The specific initial modulus is 263.8 MPa/g/cc. Without the use of a solvent, the density of the Parmax™ foams is about 1 g/cc using the same foaming condition.

Example 8

Microcellular foams can be processed from several variations of polymers and composites derived from the aforementioned molecular composites. For example, Parmax™-1200 has been copolymerized with polyethersulfone to reduce the viscosity at elevated temperatures. The copolymer was supplied as a fine powder by Maxdem Inc. at San Dimas, Calif. The foaming procedures shown in FIG. 1 with option A were used to foam this copolymer. The fine powders were compression molded into a disk about 2.25-in in diameter. Carbon dioxide gas was used as the foaming fluid at about 3900 psi at temperature ranging from 260° C. to 350° C., and with soak times of about 35 minutes. The resulting foam was examined by SEM and showed that the pores are closed cell and between 20 and 40 microns in diameter. The density of the foam is about 0.59 g/cc (36.6 pcf). The experiment was repeated with option B, FIG. 1 where NMP was used as the solvent. As a result, the foam density was reduced to 0.40 g/cc (24.9 pcf). With some adjustment of the foaming condition the density of the copolymer foam was further reduced to 0.28 g/cc (17.47 pcf).

There have thus been described a novel classes of microporous nanocomposite and molecular-composite foams and methods for their manufacture.

From the foregoing description, one skilled in the art can easily ascertain the essential characteristics of this invention, and without departing from the spirit and scope thereof, make various changes and modifications to the invention to adapt it to various usages and conditions. It is therefore intended that the scope of the invention is limited only by the scope of the appended claims.

What is claimed is:

1. A microcellular nanocomposite or molecular-composite polymer foam shape produced by a process comprising:
   a) compression molding a nanocomposite or molecular-composite polymer to be foamed into a consolidated shape comprising up to about 30 weight percent of a filler selected from the group consisting of chopped glass fibers, carbon fibers, metallic fibers, aramid fibers, ceramic whiskers, ceramic fibers and calcium carbonate powder;
   b) saturating the consolidated shape with an inert gas at an elevated pressure and at a temperature above the glass transition temperature of said polymer;
   c) fully or partially releasing the pressure; and
   d) controllably quenching said polymer shape to a temperature below the glass transition temperature of the polymer.

2. The microcellular nanocomposite or molecular-composite foam shape of claim 1 wherein said nanocomposite or said molecular-composite is blended with from about 50 to about 150 weight percent of said solvent.

3. A microcellular nanocomposite or molecular-composite polymer foam shape produced by a process comprising:
   a) compression molding a nanocomposite or molecular-composite polymer selected from the group consisting of blends of nanofibers or nano powders with a polymer and polyhedral oligomeric silsesquioxanes into a consolidated shape;

b) saturating the consolidated shape with an inert gas at an elevated pressure and at a temperature above the glass transition temperature of said polymer;
c) fully or partially releasing the pressure; and
d) controllably quenching said polymer shape to a temperature below the glass transition temperature of the polymer.

4. A microcellular nanocomposite or molecular-composite polymer foam shape produced by a process comprising:
a) compression molding a molecular-composite polymer comprising rigid rod polymer molecules dispersed in a matrix of a flexible coil polymer at the molecular level;
b) saturating the consolidated shape with an inert gas at an elevated pressure and at a temperature above the glass transition temperature of said polymer;
c) fully or partially releasing the pressure; and
d) controllably quenching said polymer shape to a temperature below the glass transition temperature of the polymer.

5. The microcellular molecular-composite foam shape of claim 4 wherein said molecular-composite comprises a member selected from the group consisting of the p-terephthaloylamide/nylon system, the poly-p-phenylenebenzobisthiazole/poly-2,5(6)-benzimidazole system and the polybenzobisthiazole (PBZT) and 2-sulfo-PBI rigid-rod polymer systems.

6. The microcellular molecular-composite foam shape of claim 4 wherein said rigid rod polymer comprises a polymer selected from the group consisting of polybenzimidazole (PBI), sulfopolybenzimidazole (2-Sulfo-PBI), polybenzobisthiazole (PBT), sulfopolybenzobisthiazole (SPBT), sulfopolybenzobisthiazole (SBPPBT), polybenzobisoxazole (PBO), hydroxy functionalized copolymer of polybenzoxazole (HPBO), and polyimide.

7. A process for the production of microcellular nanocomposite or molecular-composite polymer foam shape comprising:
a) compression molding a nanocomposite or molecular-composite polymer to be foamed into a consolidated shape comprising up to about 30 weight percent of a filler selected from the group consisting of chopped glass fibers, carbon fibers, metallic fibers, aramid fibers, ceramic whiskers, ceramic fibers and calcium carbonate powder;
b) saturating the consolidated shape with an inert gas at an elevated pressure and at a temperature above the glass transition temperature of said polymer;
c) fully or partially releasing the pressure; and
d) controllably quenching said polymer shape to a temperature below the glass transition temperature of the polymer.

8. A process for the production of a microcellular nanocomposite or molecular-composite polymer foam shape comprising:
a) compression molding a nanocomposite or molecular-composite polymer selected from the group consisting of blends of nanofibers or nano powders with a polymer and polyhedral oligomeric silsesquioxanes into a consolidated shape;
b) saturating the consolidated shape with an inert gas at an elevated pressure and at a temperature above the glass transition temperature of said polymer;
c) fully or partially releasing the pressure; and
d) controllably quenching said polymer shape to a temperature below the glass transition temperature of the polymer.

9. A process for the production of a microcellular nanocomposite or molecular-composite polymer foam shape comprising:
a) compression molding a molecular-composite polymer comprising rigid rod polymer molecules dispersed in a matrix of a flexible coil polymer at the molecular level;
b) saturating the consolidated shape with an inert gas at an elevated pressure and at a temperature above the glass transition temperature of said polymer;
c) fully or partially releasing the pressure; and
d) controllably quenching said polymer shape to a temperature below the glass transition temperature of the polymer.

10. The process of claim 9 wherein said quenching is performed by reducing the temperature of the polymer shape to below the glass transition temperature of the polymer while maintaining said elevated pressure in an inert atmosphere.

11. The process of claim 9 wherein said quenching is performed by partially reducing said elevated pressure, cooling said polymer shape to a temperature below the glass transition temperature of said polymer, and reducing the pressure to ambient.

12. The process of claim 9 wherein saturating is performed at a pressure above about 1000 psi.

13. The process of claim 9 wherein said inert gas is selected from the group consisting of nitrogen, argon, helium, and carbon dioxide.

14. The process of claim 9 said polymer shape is consolidated prior to saturating by the application of pressure above about 8000 psi when said consolidation is performed at room temperature.

15. The process of claim 9 wherein said nanocomposite or molecular-composite is blended with a solvent prior to consolidation.

16. The process of claim 9 wherein said nanocomposite or said molecular-composite is blended with from about 50 to about 150 weight percent of said solvent prior to consolidation.

17. The process of claim 9 wherein said nanocomposite is selected from the group consisting of blends of nanofibers or nano powders with a polymer and polyhedral oligomeric silsesquioxanes.

18. The process of claim 9 wherein said molecular-composite comprises rigid rod polymer molecules dispersed in a matrix of a flexible coil polymer at the molecular level.

19. The process of claim 9 wherein said molecular-composite comprises a member selected from the group consisting of the p-terephthaloylamide/nylon system, the poly-p-phenylenebenzobisthiazole/poly-2,5(6)-benzimidazole system and the polybenzobisthiazole (PBZT) and 2-sulfo-PBI rigid-rod polymer systems.

20. The process of claim 18 wherein said rigid rod polymer comprises a polymer selected from the group consisting of polybenzimidazole (PBI), sulfopolybenzimidazole (2-Sulfo-PBI), polybenzobisthiazole (PBT), sulfopolybenzobisthiazole (SPBT), sulfopolybenzobisthiazole (SBPPBT), polybenzobisoxazole (PBO), hydroxy functionalized copolymer of polybenzoxazole (HPBO), and polyimide.

* * * * *